Dec. 27, 1960  S. B. DUNHAM  2,966,590
RADIATION ATTENUATION COMPARATOR INTEGRATOR
Filed March 12, 1957

INVENTOR.
STUART B. DUNHAM
BY
Attorneys

United States Patent Office 2,966,590
Patented Dec. 27, 1960

2,966,590

RADIATION ATTENUATION COMPARATOR INTEGRATOR

Stuart B. Dunham, Schenectady, N.Y., assignor, by mesne assignments, to the United States of America as represented by the Secretary of the Navy Filed Mar. 12, 1957, Ser. No. 645,647

6 Claims. (Cl. 250—83.3)

This invention relates to a radiation measuring device, which device produces a single reading when a particular wide area of radiation contamination is being measured and also produces a single reading when, for example, the radiation of a single fuel slug in an atomic pile is being measured.

The object of this invention therefore is a radiation measuring device which gives a single reading regardless of the size of the radiation source being measured.

A further object of this invention is the use of a shielded detector thereby allowing the use of the particular measuring instrument in instances where it is impractical to locate an unshielded detector.

These and other objects will be readily apparent from an examination of the following description and attached drawings wherein.

Figure 1:
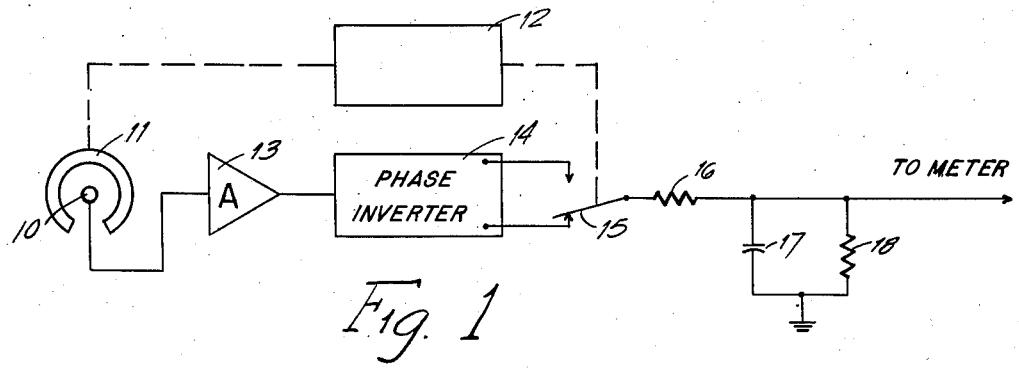
Figure 1 shows a first modification of the instant invention.

Referring to Figure 1, a detector 10 is wired to a log type amplifier 13; the amplified signal then passes through a conventional phase inverter 14. The inverter may consist of a single triode circuit with equal resistors in the plate and cathode elements. A change in grid voltage will thus give equal and opposite changes in the voltages at the plate and cathode.

Switch 15 is connected to the leads coming from the plate and cathode resistors of the inverter and is followed by a conventional integrating circuit. The latter circuit consists of an isolating resistor 16, the charging capacitor 17 and the discharging resistor 18. The integrated signal is then fed into a conventional meter or recorder (not shown).

The signals fed into the inverter and amplifier are controlled by the switch 15 and the rotatable shield interconnected mechanically by any type of mechanical linkage, and the oscillating means 12. The oscillating means moves the switch 15 from one contact to the next, and at the same time it rotates the shield in a predetermined cycle from its position where it leaves the detector 10 exposed to the radiation source, to its position where it shields detector 10 from the radiation source.

The mechanical coupling 12 alternately operates switch 15 that changes the output integrating circuit alternately from the cathode to the plate of the phase inverter so that the signal it receives is positive when the shield is removed from the ionization chamber 10 and negative when the shield is in front of the chamber. The log type amplifier 13 in the attenuation channel produces an output which is a logarithmic function of the radiation intensity represented input signal from the chamber 10 and may be represented generally by the equation $e = k \log R$. The phase inverter 14 alternately supplies the positive $(+e)$ and negative $(-e)$ of this signal to the integrating circuit. Hence, the voltage appearing across capacitor 17 is an algebraic difference of the attenuated and unattenuated voltage from the radiation source.

This then may be expressed as $\log R_{UNATT} - \log R_{ATT}$ which is equal to the log $$\frac{R_{UNATT}}{R_{ATT}}$$

since logarithms are being subtracted. Thus, the output from the storage or integrating circuit is the logarithm of this ratio and may be plotted on semi-log chart paper which is properly calibrated in the actual values of the ratio. The average value of the output integrating signal will then be proportional to the ratio of attenuation of the shield; and if this shield has been properly chosen, it will be proportional to the ratio of attenuation of a given amount of atmosphere between the source and the detector.

Figure 2:
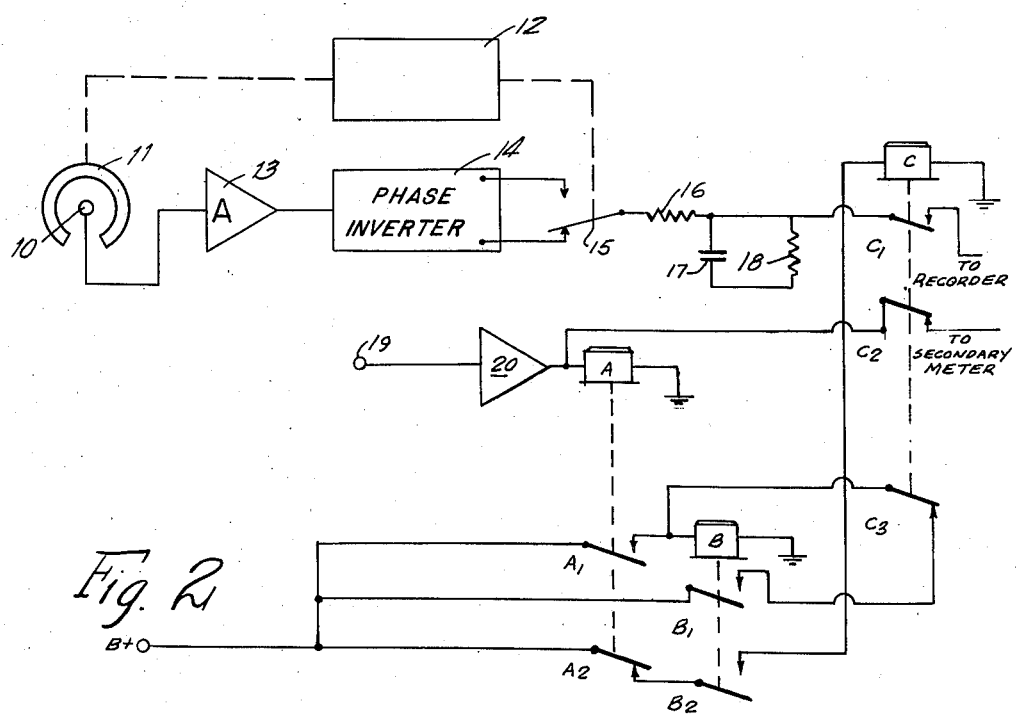
Figure 2 shows a second modification of the invention.

If the radioactive material is on the ground and has the same constitution everywhere it has been placed, it will not be necessary to constantly measure the attenuation ratio as the ratio will be constant everywhere. At the same time greater accuracy can be attained if the average value of the ratio is determined as the spontaneous fluctuations will be reduced. The device of Figure 2 produces this result.

As shown in the figure, the basic detector circuit is identical with that of Figure 1. However, normally open contacts C-1 are placed between the integrating circuit and the recorder. In addition, a secondary detector 19 is supplied, which has its signal amplified by amplifier 20. The signal passes through contacts C-2 and continues to a secondary meter, for example, a visual recorder. Coil A is joined to the amplifier or contact and grounded at the opposite end of the coil.

A relay circuit is provided for contacts C-1 and C-2. Coil B, which is provided with a magnetic time delay, is connected to B+ power via normally open contacts $a$-1 and a locking circuit having normally closed contacts $c$-3 and normally open contacts $b$-1.

Coil C is connected to B+ power via normally closed contacts $a$-2 and normally open contacts $b$-2. The opposite sides of coils B and C are connected to ground.

In passing over an area of interest (for example, by airplane), relay A will be energized when a predetermined value of radiation is reached. N. O. contacts $a$-1 are closed thereby energizing coil B and closing N. O. contacts $b$-1 and $b$-2. Contacts $c$-3 and $b$-1 are closed providing a locking circuit for B. Prior to the closing of contacts $b$-2, N. C. contacts $a$-2 are opened due to energizing of coil A. A normal signal is then passed from detector 19 to the secondary meter through N. C. contact $c$-2.

When the signal falls below the value of interest when the area of radiation interest is passed, relay A is de-energized allowing N. C. contact $a$-2 to return to its normal state. Coil C is thereby energized so that normally closed contacts $c$-2 and $c$-3 are opened and normally open contact $c$-1 is closed. As a result of opening contact $c$-3 the relay B locking circuit is broken and coil B is de-energized. This returns contact $b$-2 to its normally open position which causes coil C to be de-energized. However, due to the magnetic time delay, coil C remains energized for a short time interval.

The shield 11 in the comparator unit is rotating when the contact $c$-1 is closed upon the energization of coil C to thereby connect the comparator unit to the recorder. The relationship of the period of rotation of the shield 11 to the delay time of the coil C is immaterial. The information which will be transmitted to the recorder when the contact $c$-1 closes is being stored in the integrating circuit consisting of the capacitor 17 and the resistance 18 during the entire period between the initial energization of the coil A by the high level radiation and its de-energization when the radiation level drops off again. Hence, the information will have been stored in this integrating circuit during this period and is immediately transmitted to the recorder when c–1 closes and it is not necessary for the shield 11 to go through an operational cycle once c–1 closes. The aforesaid integrating circuit averages the attenuation ratio during the time period between the energization and de-energization of the coil A. The time delay maintains relay C energized a sufficient length of time for the comparator to produce a single reading on the recording instrument. When relay B does drop out, the circuits return to their normal position and the cycle is not repeated until the signal first exceeds and then drops below the critical value.

Obviously many modifications and variations of the present invention are possible in the light of the above teachings. It is therefore to be understood that within the scope of the appended claims the invention may be practiced otherwise than as specifically described.

What is claimed is:

1. In combination a radiation measuring device comprising, a detector, a rotatable shield around the detector, an amplifier connected to the output of the detector, a phase inverter connected to the output of the amplifier, a switch having an armature and a pair of contacts, means mechanically connecting and synchronizing movement of the armature of the switch with movement of the rotatable shield; an integrating circuit; means electrically connecting through the switch the output of the phase inverter and the input of the integrating circuit; and a meter connected to the output of the integrating circuit for measuring the radiation.

2. The circuit of claim 1 further including a pair of normally open contacts on the output side of the integrating circuit, and means to close said contacts for a short interval of time.

3. In a radiation detecting circuit comprising a detector, a rotatable shield to cover the detector from a radiation source, means to rotate the shield in a predetermined cycle whereby attenuated and unattenuated signals are transmitted by the detector, an amplifier connected to the output of the detector, a phase inverter connected to the output of the amplifier, a switch having an armature and a pair of contacts, means mechanically connecting and synchronizing movement of the armature of the switch with movement of the rotatable shield, an integrating circuit, means electrically connecting through the switch the output of the phase inverter and the input of the integrating circuit.

4. In the circuit of claim 3 further including a normally open pair of contacts connected to the output of the integrator, and a relay circuit connected to the contacts to close said contacts momentarily upon the rising and falling of the unattenuated signal above and below a predetermined value.

5. A radiation detecting circuit comprising a detector; an amplifier connected to the output of the detector; a normally closed contact connected to the output side of the amplifier; a coil connected to the output side of the amplifier in parallel with the aforesaid contact; a meter connected to the contact for measuring the unattenuated radiation signal transmitted by the detector, the combination therewith of the improvement for simultaneously correcting for attenuation effects upon the radiation said improvement including an attenuation comparator comprising a detector; a rotatable shield to cover the detector from a radiation source; means to rotate the shield in a predetermined cycle whereby attenuated and unattenuated signals are transmitted by the detector; an amplifier connected to the output of the detector; a phase inverter connected to the output of the amplifier; a switch having an armature and a pair of contacts; means mechanically connecting and synchronizing movement of the armature of the switch with movement of the rotatable shield; an integrating circuit; means electrically connecting through the switch the output of the phase inverter and the input of the integrating circuit; a normally open contact on the output side of the integrating circuit; coil means for controlling the movement of said contact; a recorder for recording a ratio of the log of the unattenuated signal to the attenuated signal; means for synchronizing energization of the coil connected to the output side of the amplifier in the radiation detecting circuit with energization of the coil controlling the movement of the normally open contact on the output side of the integrating circuit so that when a signal is picked up which exceeds a predetermined value a recording of the signal and the attenuation ratio will be simultaneously recorded.

6. A device according to claim 5 wherein the means for synchronizing energization of the coil connected to the output side of the amplifier in the radiation detecting circuit with energization of the coil controlling the movement of the normally open contact on the output side of the integrating circuit is a locking circuit comprising a normally closed contact; a coil; means to energize said coil; a normally open contact that is locked closed when said coil is energized.

References Cited in the file of this patent

UNITED STATES PATENTS

| | | |
|---|---|---|
| 2,316,361 | Piety | Apr. 13, 1943 |
| 2,332,873 | Silverman | Oct. 26, 1943 |
| 2,518,115 | Bernstein | Aug. 8, 1950 |